United States Patent
Tsai et al.

(10) Patent No.: US 10,282,736 B2
(45) Date of Patent: May 7, 2019

(54) DYNAMIC MODIFICATION OF A PARAMETER OF AN IMAGE BASED ON USER INTEREST

(71) Applicant: Excalibur IP, LLC, New York, NY (US)

(72) Inventors: Grace Tsai, West Covina, CA (US); Hsin-Chan Chien, Taipei (TW); Anne Yu, Taipei (TW); Fa-Hsien Li, Taipei (TW); Bryan Chan, Taipei (TW)

(73) Assignee: Excalibur IP, LLC, New York, NY (US)

( * ) Notice: Subject to any disclaimer, the term of this patent is extended or adjusted under 35 U.S.C. 154(b) by 520 days.

(21) Appl. No.: 13/898,789

(22) Filed: May 21, 2013

(65) Prior Publication Data

US 2014/0351000 A1 Nov. 27, 2014

(51) Int. Cl.
*G06Q 30/02* (2012.01)
*G06F 17/30* (2006.01)

(52) U.S. Cl.
CPC ... *G06Q 30/0201* (2013.01); *G06F 17/30035* (2013.01); *G06F 17/30038* (2013.01); *G06F 17/3053* (2013.01); *G06F 17/3087* (2013.01); *G06F 17/30268* (2013.01); *G06F 17/30554* (2013.01); *G06F 17/30867* (2013.01)

(58) Field of Classification Search
CPC .......... G06Q 30/0201; G06Q 30/0202; G06Q 30/0203; G06Q 30/0204; G06Q 30/0205; G06F 17/30867; G06F 17/30554; G06F 17/3053; G06F 17/30035; G06F 17/30038; G06F 17/30268; G06F 17/30

USPC .......... 705/7.29, 7.3, 7.31, 7.32, 7.33, 7.34; 707/E17.004, 999.005, 999.004, 999.003, 707/706, 707, 708, 722, 723, 724, 727, 707/728, 730, 732, 749
See application file for complete search history.

(56) References Cited

U.S. PATENT DOCUMENTS

| | | | |
|---|---|---|---|
| 8,417,712 B2* | 4/2013 | Narayanan | G06F 17/30265 707/749 |
| 2005/0055344 A1* | 3/2005 | Liu et al. | 707/3 |
| 2006/0204142 A1* | 9/2006 | West et al. | 382/305 |

(Continued)

OTHER PUBLICATIONS

Ren, et al., Interactive Search and Browsing Interface for Large-Scale Visual Repositories, 49 Multimedia Tools and Applications, 513-528 (2010) (Year: 2010).*

*Primary Examiner* — Charles Guiliano
(74) *Attorney, Agent, or Firm* — Penilla IP, APC (57) ABSTRACT

Methods and systems for changing a parameter associated with an image displayed on a display screen based on criteria related to a user are described. One of the methods includes receiving a selection of an image from a plurality of images. The method further includes examining the selected image to identify a keyword and criteria associated with the selected image. The keyword includes an identification of the image and the criteria including a time associated with the selected image. The method further includes ranking the selected image compared to remaining images of the plurality of images based on the keyword and the criteria, assigning a weight to an image parameter of the selected image to associate the image parameter with the rank of the selected image, and sending the assigned weight of the image parameter to a display device for display of the selected image according to the assigned weight.

20 Claims, 7 Drawing Sheets

(56) References Cited

U.S. PATENT DOCUMENTS

| | | | |
|---|---|---|---|
| 2007/0266025 A1* | 11/2007 | Wagner et al. | 707/7 |
| 2008/0097981 A1* | 4/2008 | Williams | G06F 17/30864 |
| 2009/0265334 A1* | 10/2009 | Narayanan | G06F 17/30265 |
| 2010/0094867 A1* | 4/2010 | Badros | G06Q 30/02 |
| | | | 707/725 |
| 2012/0124036 A1* | 5/2012 | Ramos | G06F 17/30274 |
| | | | 707/723 |
| 2012/0296920 A1 | 11/2012 | Sahni et al. | |
| 2013/0125069 A1* | 5/2013 | Bourdev | G06F 3/04845 |
| | | | 715/863 |
| 2014/0168205 A1* | 6/2014 | Naveh | G06T 19/20 |
| | | | 345/419 |

* cited by examiner

DYNAMIC MODIFICATION OF A PARAMETER OF AN IMAGE BASED ON USER INTEREST

TECHNICAL FIELD

The present disclosure relates generally to methods and systems for dynamic modification of a parameter of an image based on user interest.

BACKGROUND

With the advancement of the Internet, there is a grown interest in obtaining and maintaining user-related data. For example, data, e.g., age, gender, marital status, education, etc., regarding a user is requested by a social networking website from the user. Once the user provides the data, the data may be used for advertisement. As another example, a user's history of renting movies is stored in a database to estimate another movie that the user might want to rent. As another example, a user's purchase of products is maintained in a database to provide suggestions to the user to purchase other related products.

It is in this content that various embodiments described in the present disclosure arise.

SUMMARY

The following detailed description together with the accompanying drawings will provide a better understanding of the nature and advantages of various embodiments described in the present disclosure.

In some embodiments, a display within a web page is dynamically changed based on user interest. For example, a block that displays an image of a president is enlarged compared to other blocks displayed on a web page upon determining that the user is interested in information regarding the president. The web page is changed to provide to a user a display that appeals to the user's interest and maintain the user's interest.

In several embodiments, a method for changing a parameter associated with an image displayed on a display screen based on criteria related to a user is described. The method includes receiving a selection of an image from a plurality of images. The selection is received via a network from a client device. The method further includes examining the selected image to identify a keyword and criteria associated with the selected image. The keyword includes an identification of the image and the criteria including a time associated with the selected image. The method further includes ranking the selected image compared to remaining images of the plurality of images based on the keyword and the criteria, assigning a weight to an image parameter of the selected image to associate the image parameter with the rank of the selected image, and sending the assigned weight of the image parameter to a display device of the client device for display of the selected image according to the assigned weight. The method is executed by one or more processors.

In some embodiments, a method for changing a parameter associated with an image displayed on a display screen based on criteria related to a user is described. The method includes capturing one or more keywords generated from one or more results displayed on a display device. The one or more results are displayed when a user interacts with a web browser, wherein the user is assigned a user identification (ID). The method further includes capturing one or more criteria of the interaction between the web browser and the user. The one or more criteria are associated with a time at which media or a snippet of media in the one or more results is accessed from a media database. The method includes ranking the one or more keywords based on the one or more criteria, assigning a weight to an image parameter of one or more images to associate the image parameter of the one or more images with the ranked keywords, and sending the assigned weights of the image parameter to the display device for display of the one or more images according to the assigned weights. The method is executed by one or more processors.

In various embodiments, a system for changing a parameter associated with an image displayed on a display screen based on criteria related to a user is described. The system includes one or more servers. The one or more servers receive a selection of an image from a plurality of images. The selection is received via a network from a client device. The one or more servers examine the selected image to identify a keyword and criteria associated with the selected image. The keyword includes an identification of the image and the criteria including a time associated with the selected image. The method includes ranking the selected image compared to remaining images of the plurality of images based on the keyword and the criteria. The method includes assigning a weight to an image parameter of the selected image to associate the image parameter with the rank of the selected image and sending the assigned weight of the image parameter to a display device for display of the selected image according to the assigned weight. The system includes one or more memory devices for storing the keyword, the criteria, and the assigned weight of the image parameter.

DETAILED DESCRIPTION

The following example embodiments and their aspects are described and illustrated in conjunction with apparatuses, methods, and systems which are meant to be illustrative examples, not limiting in scope.

Figure 1A:
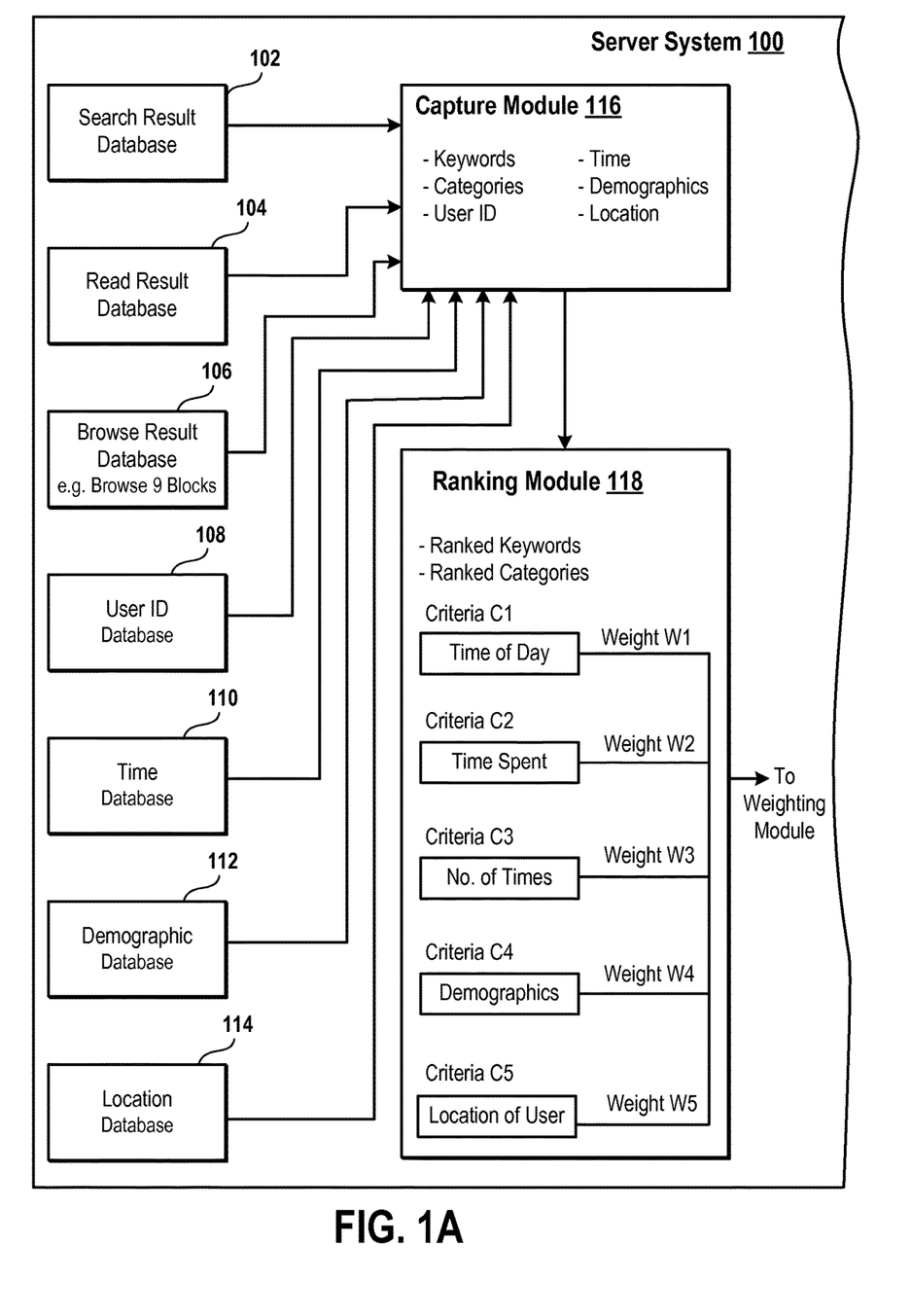
FIG. 1A is a diagram of a portion of a server system for modifying an image based on user interest, in accordance with several embodiments described in the present disclosure.

FIG. 1A is a diagram of an embodiment of a portion of a server system 100 for modifying an image based on user interest. The server system 100 includes one or more servers. Each server includes one or more processors and one or more memory devices.

It should be noted that in some embodiments, a processor, as used herein, includes a microprocessor, a central processing unit (CPU), a microcontroller, an application specific integrated circuit (ASIC), or a programmable logic device (PLD), etc., that performs processing operations described below. As used herein, a memory device includes a read-only memory (ROM), a random access memory (RAM), or a combination of the ROM and RAM. Examples of a memory device include a hard disk, a flash memory, a redundant array of independent disks (RAID), a computer disc ROM (CD-ROM), etc.

The one or more memory devices of the server system 100 store one or more databases, e.g., a search result database 102, a read result database 104, a browse result database 106, a user identification (ID) database 108, a time database 110, a demographic database 112, and a location database 114.

The search result database 102 includes a search term identifier of a search term, e.g., text, etc., within a search query received from a user. The user provides the search query to a search engine, which is executed by the one or more processors of the server system 100. For example, the search result database 102 includes a search term that is received from a user having a user ID via a search engine. It should be noted that search results produced by a search engine based on a search term includes media, a snippet of the media, a hyperlink to the media, a hyperlink to the snippet of media, or a combination thereof. Examples of media include audio, video, text, or a combination thereof. Other examples of media include a song, an article, an animation, an image, or a combination thereof, etc. In some embodiments, an example of a snippet of a video is an image.

It should further be noted that the search result database 102 includes any number of search term identifiers of any number of search terms received from any number of users. A search term is received during execution of a web browser, which is an application that allows access to the World Wide Web. Also, a search term identifier of a search term distinguishes the search term from another search term. The other search term identifier is provided a different search term identifier.

In some embodiments, a search term identifier includes a keyword and the keyword includes a search term received from a user, a term within search results generated in response to receiving a search query of the search term, a term within media that is embedded within the search results, a term within a snippet or media that is embedded within the search results, or a combination thereof.

In various embodiments, a search term identifier is metadata generated from a keyword.

It should be noted that in several embodiments, a keyword is a category, e.g., a title, a topic, a name, etc, of media or a snippet of media searched by a search engine. In some embodiments, a search term identifier is a code that is assigned to a keyword by the one or more processors of the server system 100.

In some embodiments, search results are displayed on one web page or across several web pages.

The read result database 104 includes a read media identifier, e.g., topic, category, title, metadata regarding the topic, category, and/or title, or a combination thereof, etc., of media that is accessed by a user from a media database (not shown). As an example, a user reads an article and the read result database 104 includes a topic of the article. The user reads the article after selecting a media, e.g., an image, text, title, etc. representing the article on a web page. The user selects the image via an input device of a client device. The image is displayed among images of other media displayed on the web page. In some embodiments, instead of selecting an article to read the article, a user reads the article after using an input device of the client device to place a cursor on the article. As another example, a user listens to a song and the read result database 104 includes a title of the song. The user listens to the song after selecting a media, e.g., an image, album, title, etc. representing the song on a web page. The image is displayed among images of other media displayed on the web page. In some embodiments, instead of selecting a media representing a song to listen to the song, a user listens to the song after using an input device of the client device to place a cursor on the media. As yet another example, a user may watch a movie and the read result database 104 includes a name of the movie. The user watches the movie after selecting a media, e.g., an image, album, title, etc. representing the movie on a web page. The image is displayed among images of other media displayed on the web page. In some embodiments, instead of selecting a media representing a movie to watch the movie, a user watches the movie after using an input device of the client device to place a cursor on the media.

In some embodiments, a selection of media by a user via the input device of the client device is received by the one or more processors of the server system 100 via a network, described below, from the client device.

It should further be noted that the read result database 104 includes any number of read result identifiers of any number of media accessed by any number of users. Also, in some embodiments, a read result identifier of media distinguishes the media from another media. The other read result identifier is provided a different read result identifier.

In various embodiments, a read result identifier of a snippet of media distinguishes the snippet from another snippet of media. The other snippet of media is assigned a different read result identifier.

In several embodiments, a read result identifier identifies media that is accessed and displayed on multiple web pages. For example, a first snippet of media is accessed to be displayed on a first web page, a second snippet of the media is accessed to be displayed on a second web page, etc.

In some embodiments, a read result identifier includes a keyword of a media or a snippet of media accessed by a user from the media database for viewing. For example, a keyword of a media or a snippet of media accessed from a media database may be a title of the media or of the snippet of media. As another example, a keyword of a media or a snippet of media accessed includes a uniform resource locator (URL) of a web page in which the media or of the snippet of media is embedded. As another example, a keyword of a media or a snippet of media accessed from a media database may be a name of the media or of the snippet of media. As yet another example, a keyword of a media or a snippet of media accessed from a media database may be a file name of a file that contains the media or that contains the snippet of media. As still another example, a keyword of a media or a snippet of media accessed from a media database may be a topic of the media or of the snippet of media. As another example, a keyword of a media or a snippet of media accessed from a media database may be a title, a URL of a web page, a name, a filename of a file, a topic, metadata of the title, metadata of the URL, metadata of the name, metadata of the filename, metadata of the topic, or a combination thereof.

In various embodiments, a keyword of a media or a snippet of media is determined by the one or more processors of the server system 100 as a word that is most frequently present within content of the media or the snippet of media that is accessed from a media database.

In some embodiments, a media or a snippet is selected or browsed through for viewing by a user when the media or the snippet is one of search results generated in response to a search query. In various embodiments, a media or a snippet is selected or browsed through for viewing by a user when a web page embedding the media or the snippet is requested by the user via a web browser. In response to the request, a web page server sends the web page to the client device via the network.

The browse result database 106 includes a browse media identifier of media or a snippet of media that a user browses through media via use of a web browser, which is executed by the one or more processors of the server system 100. For example, a user uses the input device to position or drag a cursor over an image on a web page to browse through the image. As another example, a user uses the input device or his/her finger to scroll down a web page to place or drag a cursor over media on the web page to browse through the media.

In some embodiments, a user browses through media after the user selects the media from among media displayed on a web page. In these embodiments, the one or more processors of the server system 100 receive the selection of media via the network from the client device.

It should further be noted that the browse result database 106 includes any number of browse result identifiers of any number of media accessed by any number of users. Also, in some embodiments, a browse result identifier of media distinguishes the media from another media. The other read result identifier is provided a different browse result identifier.

In various embodiments, a browse result identifier of a snippet of media distinguishes the snippet from another snippet of media. The other snippet of media is assigned a different browse result identifier.

In various embodiments, a keyword of a media or a snippet of media is determined by the one or more processors of the server system 100 as a word that is most frequently present within content of the media or the snippet of media that is browsed by a user.

In several embodiments, a browse result identifier identifies media that is accessed and displayed on a single web page. In various embodiments, a single web page includes only one web page. In some embodiments, a single web page is identified with one URL, which is different from a URL identifying another web page.

In some embodiments, a browse result identifier includes a keyword of a media or a snippet of media browsed by a user for viewing. For example, a keyword of a media or a snippet of media browsed may be a title of the media or of the snippet of media. As another example, a keyword of a media or a snippet of media browsed includes a uniform resource locator (URL) of a web page in which the media or of the snippet of media is embedded. As another example, a keyword of a media or a snippet of media browsed may be a name of the media or of the snippet of media. As yet another example, a keyword of a media or a snippet of media browsed may be a file name of a file that contains the media or that contains the snippet of media. As still another example, a keyword of a media or a snippet of media browsed may be a topic of the media or of the snippet of media. As another example, a keyword of a media or a snippet of media browsed may be a title, a URL of a web page, a name, a filename of a file, a topic, metadata of the title, metadata of the URL, metadata of the name, metadata of the filename, metadata of the topic, or a combination thereof.

In some embodiments, an identifier includes numbers, alphabets, symbols, images, or a combination thereof.

In various embodiments, the one or more processors of the server system 100 assign a search term identifier to a search term, a read result identifier to media or a snippet of media, and a browse result identifier to media or a snippet of media.

In several embodiments, the one or more processors of the server system 100 examine the media or a representation of the media that is selected by a user to view the media to determine a keyword, e.g., the read result identifier, the browse result identifier, etc., and criteria associated with the selected media or the representation of the media. Examples of the criteria are provided below.

The user ID database 108 includes a user ID of a user. A user ID of a user distinguishes the user from another user having a different user ID. In various embodiments, a user ID may provide access to a user to a service, e.g., an email service, a social network service, a streaming video service, a streaming audio service, a search engine service, a web browser service, or a combination thereof, etc. It should be noted that the user ID database 108 includes any number of user IDs of any number of users.

In various embodiments, the one or more processors of the server system 100 assign to a user, a user ID. For example, the one or more processors of the server system 100 receive one or more characters from a user via the input device of the client device and determine whether the characters are assigned to another user within the World Wide Web. If the characters are assigned to another user within the World Wide Web, the one or more processors of the server system 100 send a notification to the user that the characters are assigned to another user within the World Wide Web and that the user cannot be assigned a user ID having the characters. Otherwise, if the characters are not assigned to another user within the World Wide Web, the one or more processors of the server system 100 assign a user ID having the characters to the user and recognize the user as having the user ID over the World Wide Web.

The time database 110 includes a time at which a user interacts with media or a snippet of media. For example, the time database 110 includes a time of day in addition to date at which a user accesses media from a database to read the media, browses through the media, or selects the media.

The time database 110 also includes an amount of time for which a user interacts with media or a snippet of media. For example, the time database 110 includes that a user reviewed an article for 10 minutes. As another example, the time database 110 includes that a user listened to a song for 20 minutes. As yet another example, the time database 110 includes that a user watched a video for 1 hour.

In some embodiments, the one or more processors of the server system 100 determine an amount of time for which one or more web pages on which media or a snippet or media is displayed on the client device that is used by a user to determine an amount of time of interaction between the media or the snippet and the user. In various embodiments, the one or more processors of the server system 100 determine an amount of time for which one or more web pages on which media or a snippet or media is displayed on a client device that is used by a user and for which there is cursor movement on the client device.

Moreover, the time database 110 includes a number of times a media or a snippet of media is accessed for selection, browsing, or viewing by a user. For example, the time database 110 includes a number of times for which an article is accessed by a user to read during a time period, e.g., today, during the last five days, in a month, etc. As another example, the time database 110 includes a number of times a song is accessed by a user to be heard during a time period. As yet another example, the time database 110 includes a number of times a video is accessed by a user to watch during a time period.

In some embodiments, the time database 110 includes a number of times a file containing media or a snippet of media is read by one or more processors of the server system 100 from a media database to facilitate access, selection, or browsing of the media or the snippet of media by a user.

The demographic database 112 includes a demographic, e.g., age, gender, marital status, relationship status, interests, hobbies, education, residence, work location, recent visits to geographic regions, etc., that a user has provided to a database. For example, a user may have provided his/her marital status, e.g., married or unmarried, etc., relationship status, e.g., in or out of a relationship, etc., to the demographic database 112. An example of the demographic database 112 includes a social network database.

The location database 114 includes a geographic location of a user. For example, the location database 114 includes a geographic location, e.g., latitude and longitude coordinates, village, town, county, city, state, country, continent, etc., of a user. In some embodiments, a global positioning satellite (GPS) transceiver within a client device is used to determine a geographic location of a user. In various embodiments, cell phone towers that communicate with a client device that is carried by a user are used to determine a geographic location of a user.

A capture module 116 of the server system 100 captures, e.g., accesses, reads, etc., information from one or more of the databases 102, 104, 106, 108, 110, 112, and 114 to provide to a ranking module 118. For example, the capture module 116 captures one or more search term identifiers identifying one or more search terms received from a user by one or more search engines. As another example, the capture module 116 captures one or more read result identifiers of media or one or more snippets of media that is accessed by a user from a media database. As yet another example, the capture module 116 captures one or more browse result identifiers of media or one or more snippets of media that is accessed by a user from the media database for browsing. As another example, the capture module 116 captures one or more user IDs of one or more users from whom one or more search terms are received, who selects media or one or more snippets of media, who reviews media or one or more snippets of media, and/or who browses through media or one or more snippets of media. As yet another example, the capture module 116 captures a time at which media or a snippet of media is accessed by a user. As another example, the capture module 116 captures an amount of time spent by a user in reviewing and/or interacting with a media or a snippet or media. As another example, the capture module 116 captures a number of times a media or a snippet or media is accessed by a user to review the media or the snippet. As yet another example, the capture module 116 captures a demographic of a user from whom a search query is received, who reviews media or a snippet of media accessed from a media database, and/or who browses through the media or the snippet of media. As another example, the capture module 116 captures a geographic location of a user from whom a search query is received, who reviews media or a snippet of media accessed from a media database, and/or who browses the media or the snippet of media.

In some embodiments, the capture module 116 performs capturing of information associated with media or a snippet of media at a time the media or the snippet of media is being displayed on the client device. Examples of the information associated with the media include a search term identifier, a read result identifier, a browse result identifier, a keyword, etc. For example, the capture module 116 performs capturing of information associated with media or a snippet of media at a time a user is browsing through the media or through the snippet of media displayed on the client device.

As used herein, in some embodiments, a module includes software, hardware, or a combination thereof. For example, a module is a computer program encoded on a computer-readable medium, e.g., a memory device, etc., and is executed by the one or more processors of the server system 100. As another example, a module is an ASIC or a PLD. As yet another example, a module is a combination of an ASIC or a PLD and a computer program.

The ranking module 118 receives one or more search term identifiers, one or more read result identifiers, and/or one or more browse result identifiers from the capture module 116. The ranking module 118 ranks the one or more search term identifiers, one or more read result identifiers, and/or one or more browse result identifiers based on one or more criteria. An example of criteria includes a time of day at which a media or a snippet or media is accessed, selected, or browsed by a user. Another example of criteria includes an amount of time spent by a user to review a media or a snippet or media. Another example of criteria includes a number of times a media or a snippet or media is accessed, selected, or browsed by a user for review. Yet another example of criteria includes a demographic of a user. Another example of criteria includes a geographic location of a user.

In some embodiments, a snippet of media or media is retrieved from a media database by the one or more processors of the server system 100 to allow a user to access, select, or browse the media or the snippet of media for review.

In various embodiments, each time a media or a snippet of media is accessed from a media database, the capture module 116 captures a keyword associated with the media or the snippet or media.

As an example of generating the criteria, when a user has accessed, selected, or browsed media or a snippet of media on a topic "cameras" during a time of day, the one or more processors of the server system 100 rank the keyword "cameras" higher at that time of the day each day compared to other keywords captured by the capture module 116 for the user. As another example, when a user has accessed, selected, or browsed one or more articles regarding a president of the United States for a higher number of times during a time period compared to reading an article regarding soccer during the time period, the one or more processors of the server system 100 provide a higher ranking to the keywords "president of the United States" than that provided to the keyword "soccer". As another example, when a user has watched a movie titled "Moon" for a greater amount of time than that spent watching a movie "Twilight", the one or more processors of the server system 100 provide a higher ranking to the keyword "Moon" than that provided to the keyword "Twilight". As yet another example, when one or more users of a demographic listen to pop music for a larger number of times or a greater amount of time than listening to country music and another user of the same demographic wishes to access, select, or browse music retrieved from a media database, the one or more processors rank the keywords "pop music" higher than the keywords "country music". As another example, when a user is located in China, any media or snippet of media to be displayed in Chinese language is ranked higher than the media or snippet in another language.

The one or more processors of the server system 100 assign a weight to criteria. For example, the one or more processors of the server system 100 assign a weight W1 to a criterion C1, a weight W2 to a criterion C2, a weight W3 to criteria C3, a weight W4 to criteria C4, and a weight W5 to criteria C5. A combination, e.g., W1C1+W2C2+W3C3+W4C4+W5C5, etc., of the weighted criteria is sent to a weighting module 120, illustrated in FIG. 1B below, of the server system 100.

In several embodiments, the combination sent by the ranking module 118 includes a single criteria, e.g., only one criteria. In various embodiments, the combination sent by the ranking module 118 includes any number of criteria. In some embodiments, one or more of the weights W1 thru W5 have a value of 1. In various embodiments, one or more of the weights W1 thru W5 have a value ranging from 0 to 1.

Figure 1B:
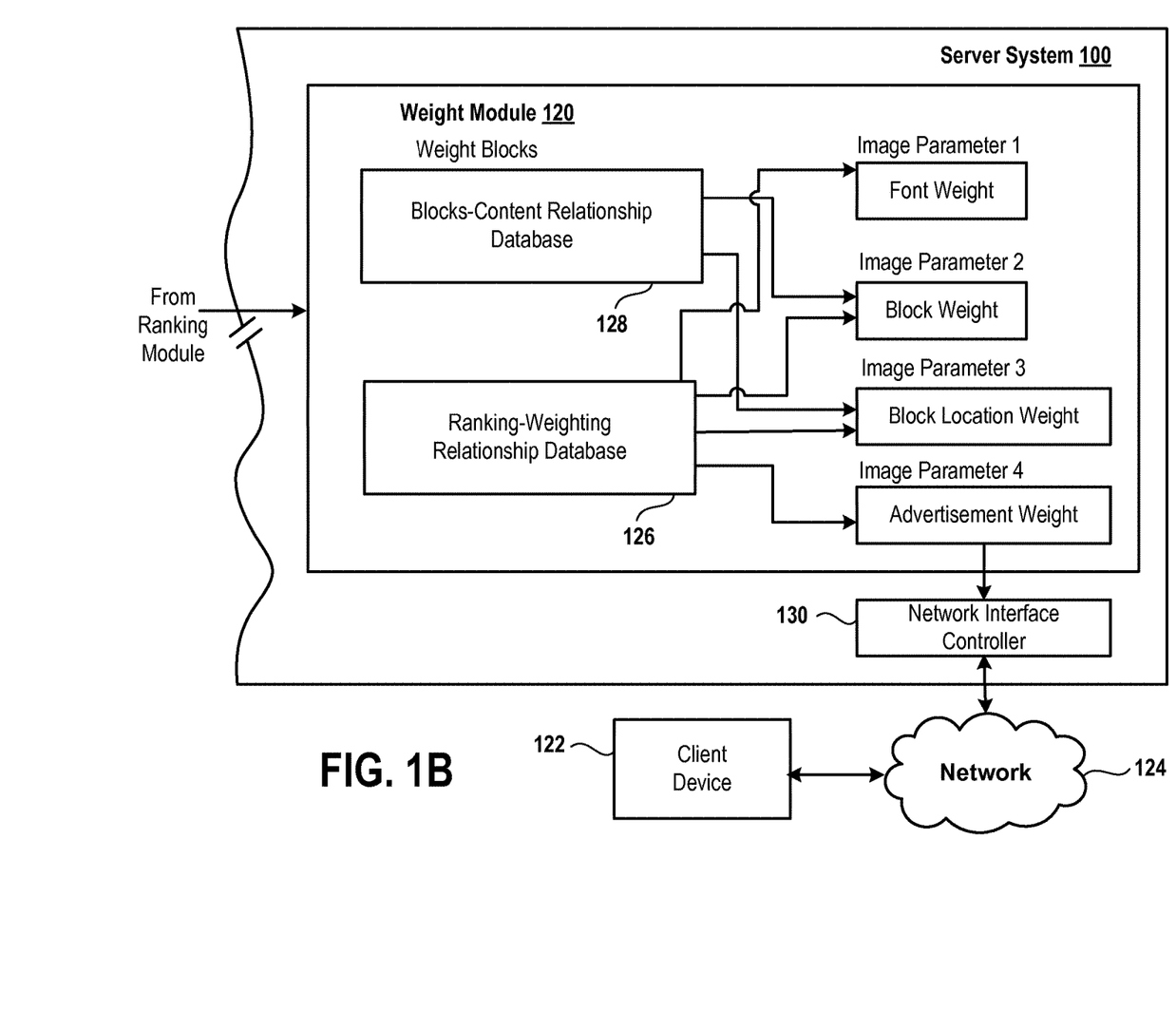
FIG. 1B is a diagram of a portion of the server system connected to a client device via a network, in accordance with some embodiments described in the present disclosure.

FIG. 1B is a diagram of an embodiment of a portion of the server system 100 connected to a client device 122 via a network 124. Examples of the client device 122 include a smart phone, a tablet, a laptop, a desktop computer, or a smart television, etc. The network 124 may be the Internet or an Intranet. In some embodiments, the network 124 is a wide area network, a local area network, or a combination thereof.

The weighting module 120 assigns a weight to an image parameter based on a value of the combination received from the ranking module 118 (FIG. 1A). For example, the higher the value of the combination received from the ranking module 118, the higher the weight that is assigned by the weighting module 120. As another example, the higher the rank assigned to a keyword by the ranking module 118 (FIG. 1A), the higher the weight assigned to an image parameter of an image of a media or a snippet of media from which the keyword is obtained. As another example, the combination having a value of 1 for a user is assigned a higher weight than another combination having a value of 0.5 for the user. Examples of an image parameter include a font size of text within an image, a font color of text within the image, a color of highlight of text within an image, a typeface of text within the image, a size of a block in which the image is displayed, a shape of an area in which the image is displayed, a location of the block on a display screen of the client device 122, a location of the block on a web page displayed on the display screen, or a combination thereof.

Relationships between the combinations for different users and the weights assigned by the weighing module 120 are stored in a ranking-weighting relationship database 126, which is stored in the one or more memory devices of the server system 100. For example, a weight assigned by the weighting module 120 to a value of a combination for a first user having a user ID is stored in the ranking-weighting relationship database 126 and a weight assigned by the weighting module to a value of a combination for a second user having a different user ID than that of the first user is stored in the ranking-weighting relationship database 126.

The weighting module 120 includes a block-content relationship database 128 that includes a relationship between one or more blocks on the display screen of the client device 122 and content, e.g., image, etc., displayed within the one or more blocks. For example, the weighting module 120 includes a number of blocks occupied by an image on the display screen of the client device 122.

In some embodiments, a block on the display screen of the client device 122 includes one or more pixels occupied by an image on the display screen of the client device 122. For example, when a web page includes two images, a first block on the web page includes one of the images and another block on the web page includes another one of the images.

In various embodiments, a value of a weight assigned to an image parameter by the one or more processors of the server system 100 is directly proportional to a rank assigned by the ranking module 118 to a keyword. For example, when a keyword "phone" is ranked higher than another keyword "shoes", a font size of 16 is assigned to the keyword "phone" by the weighting module 120 and a font size of 12 is assigned to the keyword "shoes" by the weighting module 120. As another example, when a keyword "tennis" is ranked higher than another keyword "karate", a block weight of 12 is assigned to the keyword "tennis" and a block weight of 8 is assigned to the keyword "karate". In some embodiments, a block weight is a number of blocks on which an image is displayed on the display screen of the client device 122. For example, 8 blocks occupied by a web page are used to display media or a snippet of media that is associated with the keyword "karate" and 12 blocks occupied by the web page are used to display media or a snippet of media that is associated with the keyword "tennis".

As yet another example of the direct proportionality between a weight assigned to an image parameter and a rank assigned by the ranking module 118 to a keyword, when a keyword "movie theater" is ranked higher than another keyword "television", a more prominent location is assigned by the weighting module 120 to the keyword "movie theater" on a web page displayed on the display screen of the client device 122 than that assigned by the weighting module 120 to the keyword "television" on the web page. In some embodiments, a prominent location on a display screen includes a location in a z-dimension closer to a user than another location on a display screen of the client device 122. In various embodiments, a prominent location on a display screen includes a location closer to a center of a display screen of the client device 122 than another location on the display screen.

As another example of the direct proportionality between a weight assigned to an image parameter and a rank assigned by the ranking module 118 to a keyword, when a keyword "wine" is ranked higher than another keyword "beer", an advertisement weight of 22 is assigned by the weighting module 120 to the keyword "wine" and an advertisement weight of 8 is assigned by the weighting module 120 to the keyword "beer". In some embodiments, an advertisement weight is an amount of time for which an advertisement is displayed within a block before, during, or after displaying media or a snippet of media within the block. For example, when an advertisement weight of 8 is assigned to the keyword "beer" and an advertisement weight of 22 is assigned to the keyword "wine", an advertisement is displayed within a block that is also used to display media or a snippet of media regarding wine for a greater amount of time than an amount of time for which an advertisement is displayed within a block that is also used to display media or snippet of media regarding beer. As another example, when an advertisement weight of 8 is assigned to the keyword "beer" and an advertisement weight of 22 is assigned to the keyword "wine", an advertisement is displayed within a block that is also used to display media or a snippet of media regarding wine for lesser time than an amount of time for which an advertisement is displayed within a block that is also used to display media or snippet of media regarding beer.

In various embodiments, an advertisement weight is a price paid by an advertiser to display an advertisement within a block before, during, or after displaying media or a snippet of media within the block. For example, when an advertisement weight of 10 assigned to the keyword "SUV" and an advertisement weight of 8 is assigned to the keyword "car", an advertisement displayed within a block that is also used to display media or a snippet of media regarding SUV is paid a higher price by an advertiser than paid by the same or a different advertiser for an advertisement displayed within a block that is also used to display media or snippet of media regarding car. As another example, when an advertisement weight of 10 assigned to the keyword "SUV" and an advertisement weight of 8 is assigned to the keyword "car", an advertisement displayed within a block that is also used to display media or a snippet of media regarding SUV is paid a lower price by an advertiser than paid by the same or a different advertiser for an advertisement displayed within a block that is also used to display media or snippet of media regarding car.

A network interface controller 130 of the server system 100 sends the one or more weights assigned by the weighting module 120 to the image parameters via the network 124 to the client device 122. As used herein, a network interface controller may be a network interface card or a network adapter. In some embodiments, a modem is used instead of the network interface controller 130.

Figure 2:
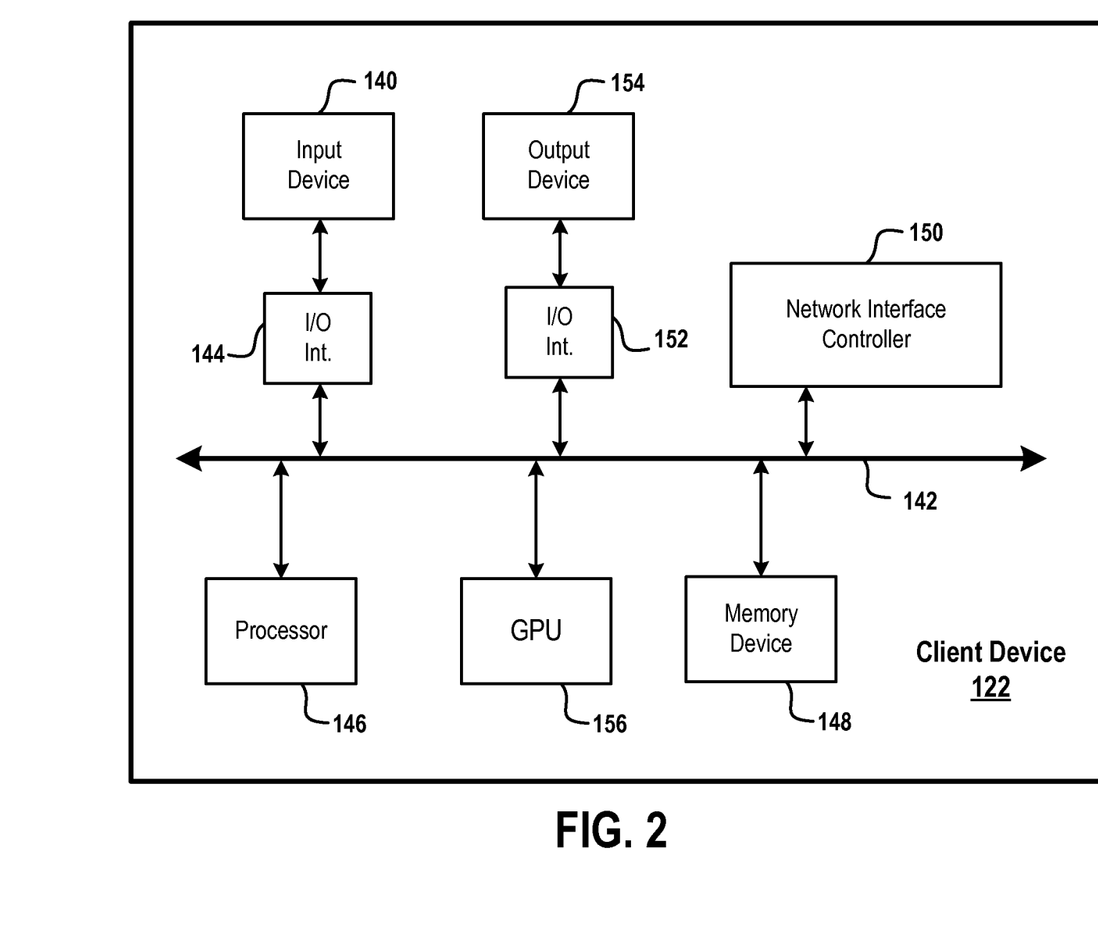
FIG. 2 is a block diagram of the client device, in accordance with various embodiments described in the present disclosure.

FIG. 2 is a block diagram of an embodiment of the client device 122. The client device 122 includes one or more input devices 140, such as, for example, a mouse, a keyboard, a stylus, a microphone, etc. The one or more input devices 140 are coupled to a bus 142 via one or more input/output interfaces 144. In some embodiments, the one or more input/output interfaces 144 convert actions, e.g., scrolling, browsing, sliding, etc., of a user with respect to the one or more input devices 140 into electrical signals that can be comprehended by one or more processors 146.

The client device 122 includes the one or more processors 146 in communication with one or more memory devices 148 via the bus 142. The client device 122 also includes a power supply (not shown), one or more network interface controllers 150, one or more input/output interfaces 152, and one or more output devices 154 that are coupled to the bus 142 via the one or more input/output interface 152. Examples of an output device include a display device, a speaker, a headset, etc. Examples of a display device includes a light emitting diode (LED) display device that includes an LED display screen, a liquid crystal display (LCD) device that includes an LCD display screen, and a cathode ray tube (CRT) display device that includes a CRT display screen. In some embodiments, an output device of the client device 122 includes a touch sensitive screen arranged to receive input from an input device, such as a stylus, or from a finger of a user.

In various embodiments, the one or more input/output interfaces 152 convert electrical signals into audio for providing feedback to a user via the one or more output devices 154. In some embodiments, the one or more input/output interfaces 152 provide compatibility between a rate at which data is transferred over the bus 142 and a rate at which media is displayed on the one or more output devices 154.

The power supply provides power to client device 122. In some embodiments, a rechargeable or non-rechargeable battery is used to provide power. In various embodiments, the power is provided by an external power source, such as an alternating current (AC) adapter or a powered docking cradle that supplements and/or recharges a battery.

The client device 122 may optionally communicate with a base station (not shown), or directly with another client device. The one or more network interface controllers 150 include circuitry for coupling the client device 122 to one or more networks, e.g., the network 124 (FIG. 1B) and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), ultra wide band (UWB), Institute of Electrical and Electronics Engineers (IEEE) 802.16 Worldwide Interoperability for Microwave Access (WiMax), or any of a variety of other wireless communication protocols. Each of the one or more network interface controllers 150 is sometimes known as a transceiver, a network adapter, or a network interface card (NIC).

A graphical processing unit (GPU) 156 executes a renderer software program that converts media data to display, such as, for example, render, etc., media or snippet of media. In some embodiments, media or snippet of media is stored in the memory device 148 or a separate memory device that is accessed by the GPU 156.

The one or more network interface controllers 150 receive one or more weights of one or more of the image parameters from the network interface controller 130 (FIG. 1B) via the network 124 and provide the one or more weights to the GPU 156.

The GPU 156 applies the one or more weights to the one or more image parameters to display one or more images having the one or more weighted image parameters on the on the one or more output devices 154. For example, when a font size of 16 is assigned to the keyword "phone" and a font size of 12 is assigned to the keyword "shoes", media or a snippet of media associated with the keyword "phone" is displayed by the GPU 156 to be larger than media or a snippet of media associated with the word "shoes". As another example, when a block weight of 12 is assigned to the keyword "tennis" and a block weight of 8 is assigned to the keyword "karate", media or a snippet of media associated with the keyword "tennis" is displayed by the GPU 156 within 12 blocks on the one or more output devices 154 and media or a snippet of media associated with the keyword "karate" is displayed by the GPU 156 within 8 blocks on the one or more output devices 154. As yet another example, when a block weight of 12 is assigned to the keyword "tennis" and a block weight of 8 is assigned to the keyword "karate", media or a snippet of media associated with the keyword "tennis" is displayed by the GPU 156 within 12 blocks on a web page displayed on the one or more output devices 154 and media or a snippet of media associated with the keyword "karate" is displayed by the GPU 156 within 8 blocks on a web page displayed on the one or more output devices 154.

As another example, when a more prominent location is assigned to the keyword "movie theater" on a web page displayed on the display screen of the client device 122 than assigned to the keyword "television" on the web page, media or a snippet of media associated with the keyword "movie theater" is displayed in a more prominent location on the one or more output devices 154 than a location on the one or more output devices 154 at which media or a snippet of media associated with the keyword "television" is displayed. As yet another example, when an advertisement weight of 22 is assigned to the keyword "wine" and an advertisement weight of 8 is assigned to the keyword "beer", media or a snippet of media associated with the keyword "wine" is displayed before, during, or after displaying an advertisement. In this example, the advertisement is displayed for a higher amount of time than an advertisement that is displayed before, during, or after displaying media or snippet or media associated with the keyword "beer". As another example, when an advertisement weight of 22 is assigned to the keyword "wine" and an advertisement weight of 8 is assigned to the keyword "beer", media or a snippet of media associated with the keyword "wine" is displayed before, during, or after displaying an advertisement. In this example, the advertisement is displayed for lesser time than an advertisement that is displayed before, during, or after displaying media or snippet or media associated with the keyword "beer".

As yet another example, when an advertisement weight of 22 is assigned to the keyword "wine" and an advertisement weight of 8 is assigned to the keyword "beer", media or a snippet of media associated with the keyword "wine" is displayed before, during, or after displaying an advertisement. In this example, the advertisement is displayed for a higher price charged to an advertiser that that charged for an advertisement that is displayed before, during, or after displaying media or snippet or media associated with the keyword "beer". As another example, when an advertisement weight of 22 is assigned to the keyword "wine" and an advertisement weight of 8 is assigned to the keyword "beer", media or a snippet of media associated with the keyword "wine" is displayed before, during, or after displaying an advertisement. In this example, an advertiser of the advertisement is charged a lesser amount than that charged to display an advertisement that is displayed before, during, or after displaying media or snippet or media associated with the keyword "beer".

It should be noted that in some embodiments, media or a snippet of media is associated with a keyword when the keyword is extracted from the media or the snippet. For example, a movie about trolls is associated with a keyword "troll" when the keyword "troll" is extracted from a title, name, and/or content, of the movie. As another example, a song sung by a famous singer is associated with a name of the singer when the name is extracted from information regarding the song. As yet another example, an article about stocks is associated with a keyword, e.g., stock symbol, etc., of a stock that when the keyword is extracted from the article or from a title of the article. In some embodiments, the one or more processors of the server system 100 (FIGS. 1A and 1B) perform the operation of extracting a keyword from media or a snippet of media. After the extracting is done, the keyword is stored within the search result database 102, the read result database 104, and/or the browse result database 106 (FIG. 1A).

The one or more memory devices 148 store a basic input/output system ("BIOS") for controlling low-level operation of the client device 122. The one or more memory devices 148 also store an operating system for controlling an operation of client device 122. It will be appreciated that in some embodiments, the operating system includes UNIX, LINUX™, or Windows Mobile™ operating system.

The one or more memory devices 148 further include applications and/or other data, e.g., media data, snippet data, etc. Examples of the applications include a web browser application, a social network service application, an email service application, a music search service application, a video search service application, etc.

Figure 3:
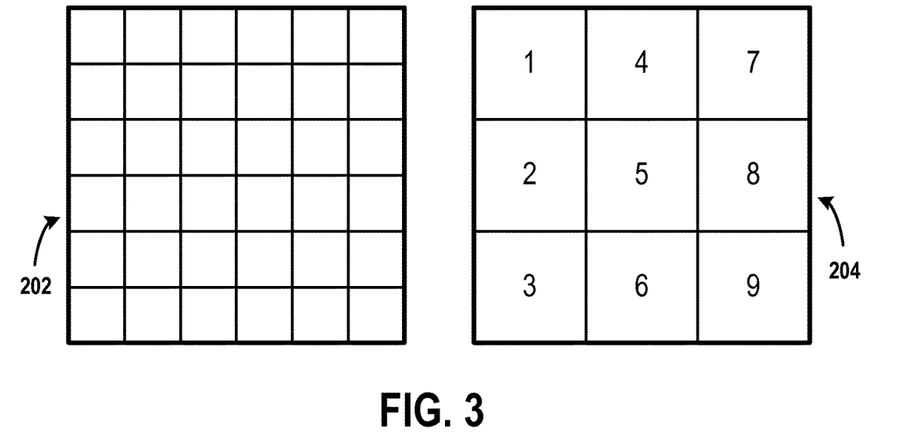
FIG. 3 is a diagram of grids that occupy a web page displayed on a display screen of the client device, in accordance with some embodiments described in the present disclosure.

FIG. 3 is a diagram of embodiments of grids 202 and 204 that occupy a web page displayed on a display screen of the client device 122 (FIG. 2). The grid 202 includes 36 blocks and the grid 204 includes 9 blocks. It should be noted that a grid may includes any number of blocks.

Also, in some embodiments, a number of blocks displayed within a grid changes with a size of a display screen. For example, on a display screen of a smart cell phone, a number of blocks is less than a number of blocks that is displayed on a display screen of a desktop computer. As another example, on a display screen of a desktop computer, a number of blocks is less than a number of blocks that is displayed on a display screen of a 50 inch television.

The blocks of the grids 202 and 204 are non-weighted or have equal weights. For example, all 9 blocks, e.g., blocks 1 thru 9, of the grid 204 are of equal size when the weights of the image parameters are not applied by the GPU 156 (FIG. 2) to the blocks or when equal weights are applied by the GPU 156 to the blocks.

Figure 4:
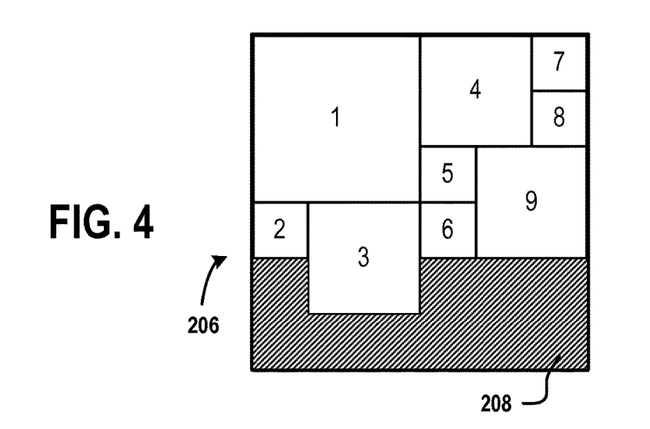
FIG. 4 is a diagram of a grid in which image parameters of blocks 1 thru 9 are weighted, in accordance with various embodiments described in the present disclosure.

FIG. 4 is a diagram of an embodiment of an embodiment of a grid 206 in which image parameters of the blocks 1 thru 9 are weighted. For example, the block 1 is larger than any other blocks 2 thru 9. As another example, the blocks 3, 4 and 9 are of equal size and are the second largest of all the blocks 1 thru 9. As another example, the blocks 2, 5, 6, 7, and 8 are of equal size and the smallest of all the blocks 1 thru 9.

Moreover, it should be noted that the block 1 of the grid 206 has a larger size than that of the block 1 in the grid 204 (FIG. 3). Similarly, the blocks 3, 4 and 9 of the grid 206 are of a larger size than that of the blocks 3, 4 and 9 in the grid 204. Also, the blocks 2, 5, 6, 7, and 8 of the grid 206 are of a smaller size than that of the blocks 2, 5, 6, 7, and 8 in the grid 204.

Weights are applied by the one or more processors of the server system 100 (FIGS. 1A and 1B) to the blocks 1 thru 9 of the grid 204 to display the blocks 1 thru 9 of the grid 206. For example, a higher amount of weight is applied to the block 1 of the grid 204 than that applied to any other block 2 thru 9 of the grid 204. As another example, a lower amount of weight is applied to the blocks 2, 5, 6, 7, and 8 of the grid 204 than that applied to any other block 1, 3, 4, and 9 of the grid 204.

The grid 206 includes a black shaded area 208, which is a portion of a web page in which the grid 206 is displayed or a display screen on which the grid 206 is displayed. The GPU 156 (FIG. 2) generates the black shaded area 208 when an area occupied by the blocks 1 thru 9 of the grid 206 on a web page or on a display screen of the client device 122 is less than an area occupied by the blocks 1 thru 9 of the grid 204 on a web page or on the display screen. It should be noted that a web page is displayed on a display screen of the client device 122.

In some embodiments, instead of the black shaded area 208, an area with cross-sectional lines, an area shaded with a color other than black, etc., may be displayed as part of the grid 206.

Figure 5:
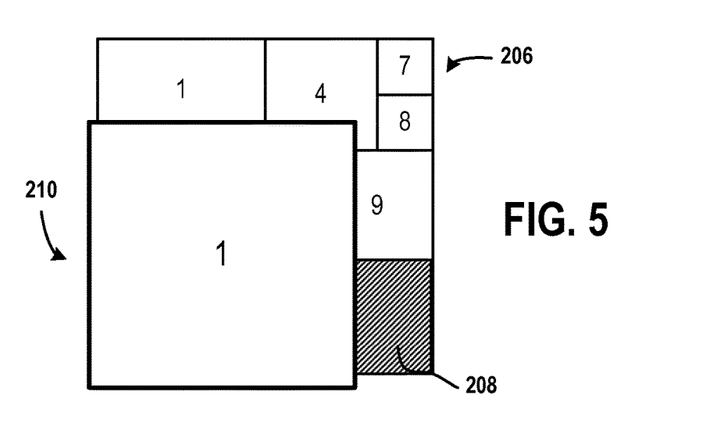
FIG. 5 is a diagram of a grid to illustrate a popup of a block of the grid, in accordance with some embodiments described in the present disclosure.

FIG. 5 is a diagram of an embodiment of the grid 206 to illustrate a popup 210 of the block 1 of the grid 206. When a user selects via the one or more input devices 140 (FIG. 2) the block 1 of the grid 206, the GPU 156 (FIG. 2) renders the popup 210. The GPU 156 increases a size of the block 1 of the grid 206 and protrudes the block 1 to generate the popup 208. The popup 210 extends outward along a z-dimension of a display screen of the client device 122 compared to the block 1 of the grid 206.

It should be noted that one or more of the blocks 1 thru 9 are visible on a display screen of the client device 122 after the popup 210 is displayed.

In some embodiments, the GPU 156 renders the popup 210 to hide the blocks 1 thru 9 behind the popup 210.

Figure 6:
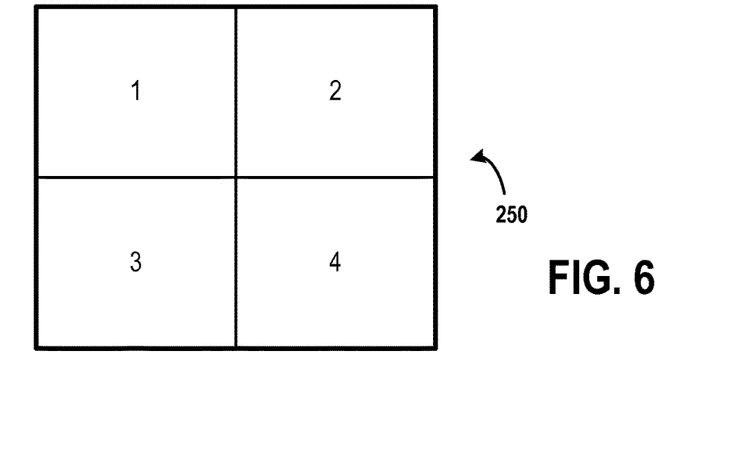
FIG. 6 is a diagram of a grid that includes four blocks 1 thru 4, in accordance with several embodiments described in the present disclosure.

FIG. 6 is a diagram of an embodiment of a grid 250 that includes four blocks 1 thru 4. The blocks 1 thru 4 of the grid 250 are non-weighted. For example, the weighting module 120 (FIG. 1B) has not applied weights or has applied equal weights to image parameters of images displayed within the blocks 1 thru 4 of the grid 250.

Figure 7A:
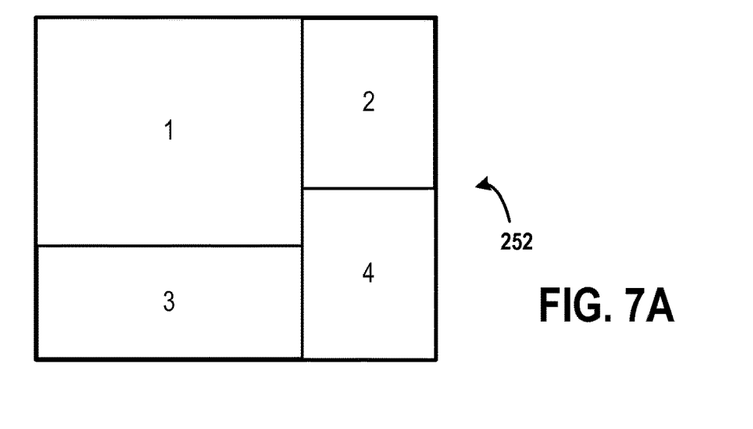
FIG. 7A is a diagram of a grid in which a combination of blocks occupies the same area on a display screen of the client device or on a web page displayed on the display screen as that occupied by a combination of the blocks after weighting the blocks, in accordance with various embodiments described in the present disclosure.

FIG. 7A is a diagram of an embodiment of a grid 252 in which a combination of the blocks 1, 2, 3, and 4 occupies the same area on a display screen of the client device 122 (FIG. 2) or on a web page displayed on the displayed screen as that occupied by a combination of the blocks 1, 2, 3, and 4 of the grid 250 (FIG. 6). For example, the GPU 156 (FIG. 2) does not generate a shaded area on a display screen of the client device 122 (FIG. 2) or on a web page displayed on the displayed screen to generate the grid 252. The grid 252 excludes a shaded portion similar to the shaded portion 208 (FIG. 4).

Moreover, the block 1 of the grid 252 is of a larger size than the block 1 of the grid 250. Also, a height, along a y-dimension, of the block 3 of the grid 252 is less than a height of the block 3 of the grid 250. Moreover, a breadth, along an x-dimension, of the block 3 of the grid 252 is greater than a breadth of the block 3 of the grid 250.

In several embodiments, instead of or in addition to changing a size of the block 1 of the grid 250 after applying weighting to one or more image parameters, the weighting module 120 designates that a shape of the block 1 of the grid 250 be changed to another shape, e.g., square, circle, oval, polygonal, irregular, etc., and an area with the changed shape is displayed by the GPU 156 within the grid 252.

In various embodiments, instead of or in addition to changing a size of one or more of the blocks 2 thru 4 of the grid 250 after applying weighting to one or more image parameters, the weighting module 120 designates that a shape of the one or more blocks 2 thru 4 of the grid 250 be changed to another shape, e.g., square, circle, oval, polygonal, irregular, etc., and an area with the changed one or more shapes is displayed by the GPU 156 within the grid 252.

Figure 7B:
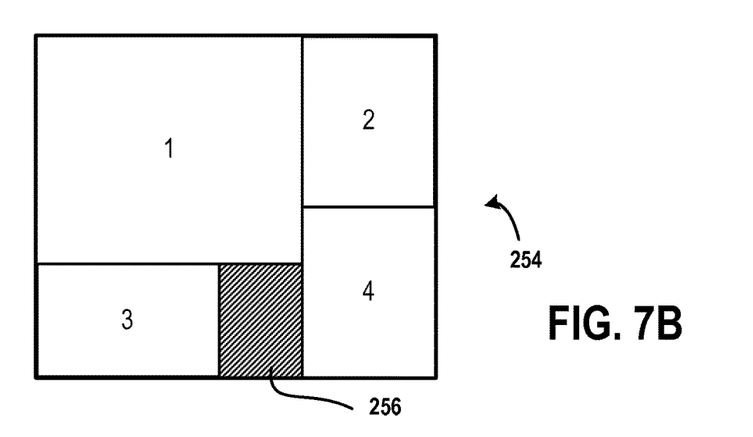
FIG. 7B is a diagram of a grid that includes a shaded area and in which blocks are weighted, in accordance with some embodiments described in the present disclosure.

FIG. 7B is a diagram of an embodiment of a grid 254 that includes a shaded area 256 and in which size of the blocks 1 thru 4 is changed. The grid 254 is similar to the grid 252 except that the grid 254 includes the shaded area 256, which reduces a size of the block 3 of the grid 254 compared to a size of the block 3 of the grid 252.

In various embodiments, instead of blocks within a grid, other shapes, e.g., circles, ovals, polygons, irregular shapes, squares, etc., may be used.

Figure 8A:
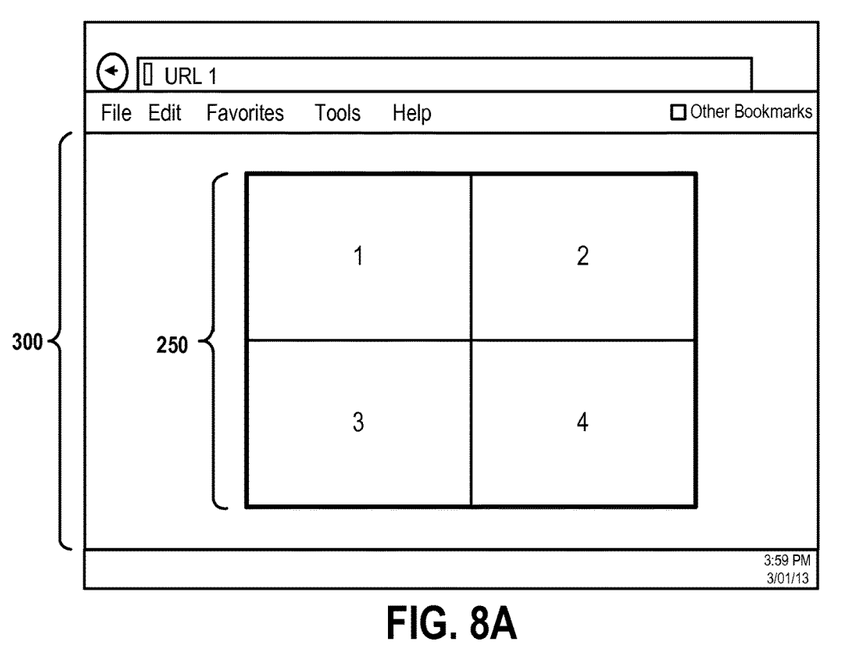
FIG. 8A is a diagram of a web page having a uniform resource location (URL) and on which unweighted blocks are displayed, in accordance with several embodiments described in the present disclosure.

FIG. 8A is a diagram of an embodiment of a web page 300 having a uniform resource location (URL) URL1. The web page 300 includes the four unweighted blocks 1 thru 4 of the grid 250. The web page 300 is accessed by the client device 122 when the one or more network interface controllers 150 (FIG. 2) send the URL1 to the server system 100 (FIGS. 1A and 1B). The request is sent when a user uses the one or more input devices 140 (FIG. 2) to access a web browser and selects the URL1 via the one or more input devices 140. A web page server of the server system 100 processes the request and sends the web page 300 via the network interface controller 130 (FIG. 1B) and the network 124 (FIG. 1B) to the client device 122 (FIG. 1B). The GPU 156 (FIG. 2) of the client device 122 renders the web page 300 on a display screen of the client device 122.

Figure 8B:
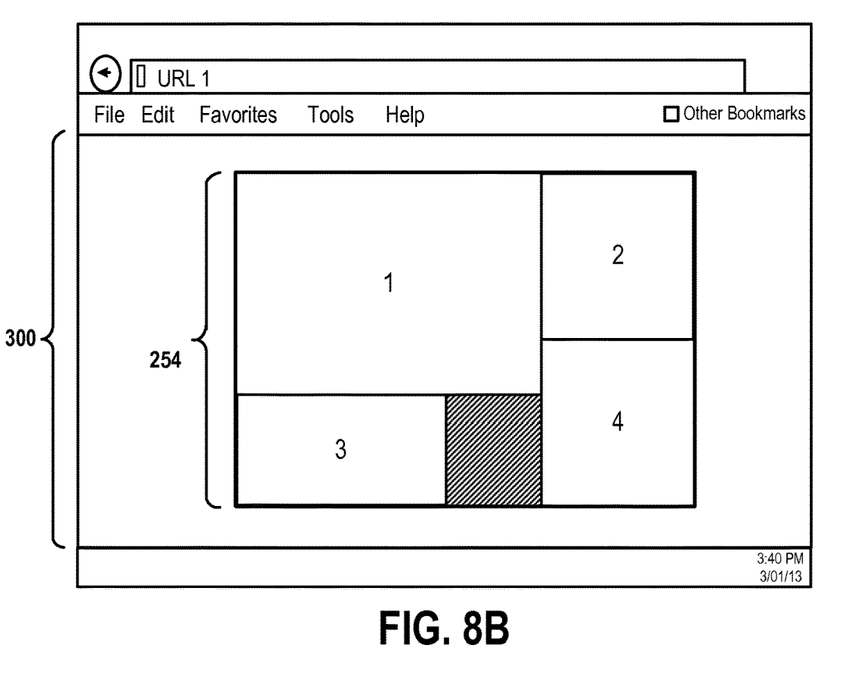
FIG. 8B is a diagram of a web page in which a weighted grid is displayed, in accordance with various embodiments described in the present disclosure.

FIG. 8B is a diagram of an embodiment of the web page 300 in which the grid 254 is displayed.

Figure 9A:
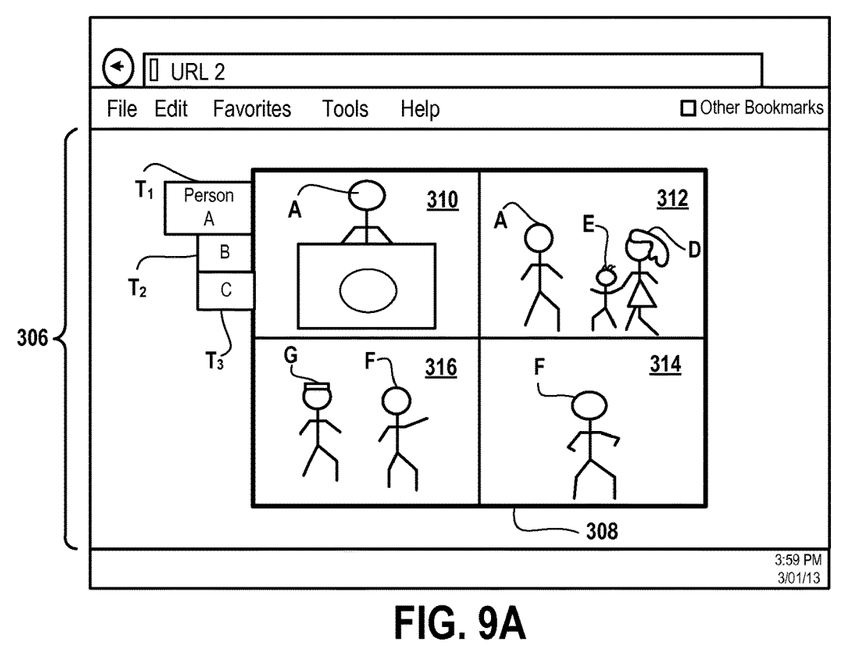
FIG. 9A is a diagram of a web page on which images are displayed within blocks that are not weighted or that have equal weights, in accordance with some embodiments described in the present disclosure.

FIG. 9A is a diagram of an embodiment of a web page 306 that is displayed by sending a request including a URL2 of the web page 306. As described above, the web page 306 is accessed in a similar manner in which the web page 300 (FIG. 8A) having the URL1 is accessed.

The web page 306 includes a grid 308 that is displayed when a user selects a tab titled "Person A" on the web page 306 via the one or more input devices 140 (FIG. 2). The web page 306 is displayed on a display screen of the client device 122.

The grid 308 includes four blocks 310, 312, 314, and 316 that are similar to the blocks 1, 2, 3, and 4 of the grid 254 (FIG. 8B) except that the blocks 310, 312, 314, and 316 include images of one or more persons and are not weighted by the weighting module 120 (FIG. 1B). For example, the block 310 includes an image of a person A speaking in front of a podium. The block 312 includes an image of the person A meeting with a child E of a mother D. The block 316 includes an image of a competitor F of the person A. A person G is providing advice to the competitor F. The block 314 includes an image of the person F speaking in front of an audience, which is not visible in the block 314.

It should be noted that the grid 308 is displayed when a user selects a tab T1 via the one or more input devices 140 (FIG. 2). The tab T1 is titled "Person A" and the title indicates to a user that when the user selects the tab T1, media or a snippet of media regarding the person A will be displayed in the grid 308. Similarly, when a user selects a tab T2 via the one or more input devices 140, media or snippet of media regarding a person B is displayed to a user in a grid. Also, when a user selects a tab T3 via the one or more input devices 140, media or snippet of media regarding a person C is displayed to a user in a grid.

Figure 9B:
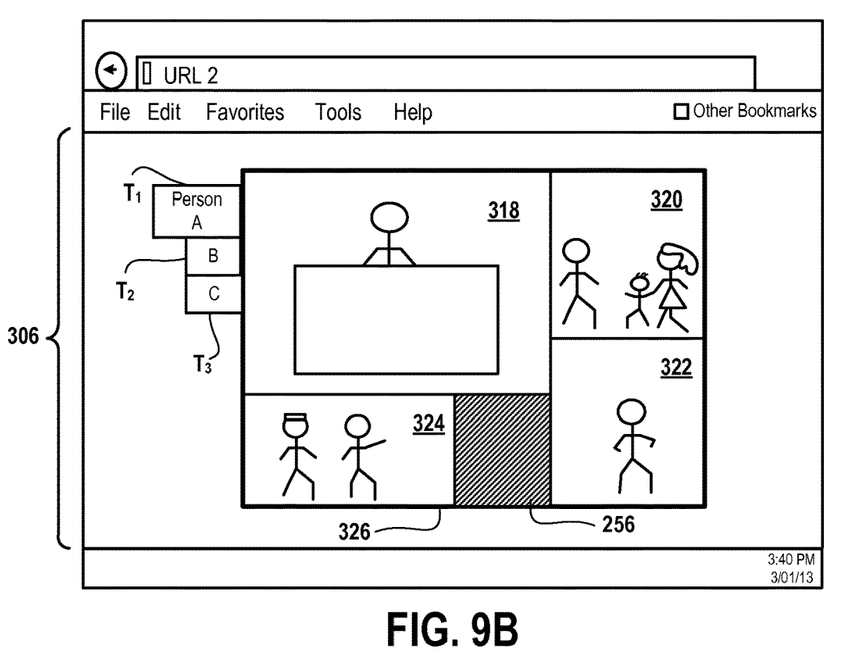
FIG. 9B is a diagram of a web page on which images are displayed within blocks that are weighted, in accordance with several embodiments described in the present disclosure.

FIG. 9B is a diagram of an embodiment of the web page 306 that displays blocks 318, 320, 322, and 324 in a grid 326 after weighting the blocks 310, 312, 314, and 316 (FIG. 9A). For example, the weighting module 120 (FIG. 1B) applies a weight to an image parameter of an image displayed in the block 310 to generate an image parameter of the block 318. As another example, the weighting module 120 applies a weight to an image parameter of an image displayed in the block 312 to designate an image parameter of the block 320. As yet another example, the weighting module 120 applies a weight to an image parameter of an image displayed in the block 314 to generate an image parameter of the block 322. As another example, the weighting module 120 applies a weight to an image parameter of an image displayed in the block 316 to generate an image parameter of the block 324.

It should be noted that the grid 326 includes the shaded area 256 and a surface area on the web page 306 displayed on a display screen of the client device 122 (FIG. 2) occupied by the grid 308 (FIG. 9A) is the same as a surface area of the web page 306 occupied by the grid 326.

In several embodiments, instead of the person A, the tab T1 includes information regarding an entity E1, e.g., a corporation, a partnership, a company, etc., and images within the blocks 310, 312, 320, and 314 (FIG. 9A) and the blocks 318, 320, 322, and 324 (FIG. 9B) are images of one or more entities, e.g., the entity E1, an entity that is related to the entity E1, a combination thereof, etc. In various embodiments, instead of the person A, the tab T1 includes information regarding a product, a service, a person, an idea, a concept, a geographic region, a combination thereof, etc., and images within the blocks are images of one or more products, one or more services, one or more persons, one or more ideas, one or more concepts, one or more geographic regions, a combination thereof, etc.

Although various embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the present disclosure is not to be limited to the details given herein, but may be modified within the scope and equivalents of the appended claims.

What is claimed is:

1. A method for displaying an image on a web page based on a selection received via a user identification account, comprising:
   receiving, by a server, via a user identification (ID) assigned to a user, the selection of the image from a plurality of images displayed within the web page displayed on a client device and a time associated with the selection of the image, wherein the web page has a uniform resource locator (URL), wherein each of the images occupies the same amount of display area on a display device of the client device and are displayed at a depth on the web page, wherein the selection is received via a computer network from the client device;
   examining, by the server, metadata associated with the image that is selected to identify a keyword;
   examining, by the server, criteria associated with the image that is selected, the keyword including an identification of the image that is selected and the criteria including the time associated with the selection of the image on the client device;
   ranking, by the server, the image compared to remaining ones of the images that are not selected based on the keyword and the criteria;
   designating, by the server, for the user ID for which the image is selected, an arrangement having a higher amount of display area and a lower depth to be occupied by the image that is selected on the web page based on the ranking, wherein the higher amount of display area is greater than the amount of display area occupied by each of the images before said designating of the higher amount, wherein the lower depth is less than and is outward compared to the depth at which the images are displayed before said designating of the lower depth, wherein the higher amount of the display area and the lower depth are configured to hide a first one of the remaining images, to hide a portion of a second one of the remaining images, and to display a remaining portion of the second one of the remaining images, wherein the lower depth is designated to indicate that the image that is selected is to be displayed as a pop-up image with respect to the remaining images, wherein the pop-up image is displayed at a different z location than a z location of the remaining images to cover the first one of the remaining images and to cover the portion of the second one of the remaining images;
   receiving, by the server, a search request via the user ID;
   analyzing the search request to determine that the search request includes the keyword;
   sending, by the server via the computer network, the arrangement to the display device of the client device for display of the image selected via the user ID as occupying the higher amount of the display area at the lower depth on a subsequent display of the web page, wherein said sending the arrangement to the display device is performed in response to the analysis of the search request that is received via the user ID after the selection of the image is received,
   receiving a geo-location of the client device from the client device;
   determining that the image that is selected is to be displayed in a language associated with the geo-location;
   increasing a size of the image that is selected in response to determining that the image is to be displayed in the language associated with the geo-location,
   wherein the method is executed by one or more processors of the server.

2. The method of claim 1, wherein the criteria includes:
a time at which the image is selected; or
an amount of time for which the image is viewed by a user; or
a number of times the image is selected; or
the geo-location of the client device; or
a combination thereof.

3. The method of claim 1, further comprising:
designating, by the server, an amount of display area to be occupied by the first one of the remaining images that is not selected, wherein the amount of display area of the first one of the remaining images that is not selected after said receiving the selection is less than the amount of display area occupied by the first one of the remaining images that is not selected before said receiving the selection.

4. The method of claim 1, further comprising:
determining, by the server, to display an advertisement associated with the keyword for the image that is selected for a greater amount of time than an amount of time for which an advertisement associated with the first one of the remaining images that is not selected is displayed.

5. A method for displaying an image on a web page based on an interaction received via a user identification account, comprising:

capturing, by a server, a plurality of keywords generated from a plurality of results displayed within the web page on a display device of a client device, wherein the web page has a uniform resource locator (URL), the results displayed when a user interacts with a web browser, wherein the user is assigned a user identification (ID), wherein the results are associated with a plurality of snippets of media, wherein each of the snippets of media occupies a same amount of display area and are displayed at a depth on the web page;

capturing, by the server via a computer network, one or more criteria of the interaction between one of the snippets of media and the user via the user ID, wherein the one or more criteria are associated with a time at which the one of the snippets of media associated with one of the results is interacted with via the user ID;

ranking, by the server, the keywords based on the one or more criteria;

designating, by the server, for the user ID for which the one of the snippets of media is interacted with, an arrangement having a higher amount of display area and a lower depth to be occupied by the one of the snippets of media on the web page based on the ranking, wherein the higher amount of display area is greater than the amount of display area occupied by each of the snippets of media before said designating of the higher amount, wherein the lower depth is less than and is outward compared to the depth at which the snippets of media are displayed before said designating of the lower depth, wherein the higher amount of the display area and the lower depth are configured to hide a first one of remaining ones of the snippets of media and to hide a portion of a second one of the remaining snippets of media, and to display a remaining portion of the second one of the remaining snippets of media, wherein the lower depth is designated to indicate that the one of the snippets of media that is interacted with is to be displayed as a pop-up with respect to the remaining snippets of media, wherein the one of the snippets of media that is interacted with is displayed at a different z location than a z location of the remaining snippets of media to cover the first one of the remaining snippets of media and to cover the portion of the second one of the remaining snippets of media;

receiving, by the server, a search request via the user ID;

analyzing the search request to determine that the search request includes one of the keywords identifying the one of the snippets of media that is interacted with;

sending, by the server via the computer network, the arrangement to the display device of the client device for display of the one of the snippets of media that is interacted with as occupying the higher amount of the display area at the lower depth on a subsequent display of the web page, wherein said sending the arrangement to the display device is performed in response to the analysis of the search request that is received via the user ID after the interaction with the one of the snippets of media is received;

receiving a geo-location of the client device from the client device;

determining that the one of the snippets of media that is interacted with is to be displayed in a language associated with the geo-location; and     increasing a size of the one of the snippets of media that is interacted with in response to determining that the one of the snippets of media is to be displayed in the language associated with the geo-location,     wherein the method is executed by one or more processors of the server.

6. The method of claim 5, wherein capturing the keywords includes retrieving from a database information regarding the one of the snippets of media that is searched for by the user using a search engine.

7. The method of claim 6, wherein the information includes a title of the one of the snippets of media, or a name of the one of the snippets of media, or a word used in the one of the snippets of media, or metadata of the title, or metadata of the name, or metadata of the word, or a combination thereof.

8. The method of claim 5, wherein capturing the keywords includes reading from a database information regarding the one of the snippets of media accessed by the user from a media database.

9. The method of claim 5, wherein capturing the keywords includes reading from a database information regarding the one of the snippets of media browsed through by the user.

10. The method of claim 5, wherein the results include: a plurality of search results generated in response to a search query; or a plurality of hyperlinks allowing access to the snippets of media.

11. The method of claim 5, further comprising receiving the user ID that identifies the user on the world wide web, wherein receiving the user ID is performed to capture the keywords.

12. The method of claim 5, wherein the criteria includes a time at which the interaction within the one of the snippets of media starts, or a time spent to perform the interaction within the one of the snippets of media, or a number of times the interaction within the one of the snippets of media occurs, or a demographic of the user, or a geographic location of the user, or a combination thereof.

13. The method of claim 5, wherein ranking the keywords based on the one or more criteria includes assigning a higher rank to the one of the keywords captured more frequently than another one of the keywords.

14. The method of claim 5, wherein ranking the keywords based on the one or more criteria includes ranking the one of the keywords higher than a second one of the keywords, wherein the criteria includes a time at which the one of the snippets of media is accessed by the user from a media database.

15. The method of claim 5, wherein ranking the keywords based on the one or more criteria includes ranking the one of the keywords higher than a second one of the keywords, wherein the criteria includes a geographic location at which the one of the snippets of media is interacted with by the user.

16. The method of claim 5, wherein ranking the keywords based on the one or more criteria includes ranking the one of the keywords higher than a second one of the keywords, wherein the criteria includes a demographic of the user.

17. The method of claim 5, further comprising:

designating, by the server, an amount of display area to be occupied by the first one of the remaining snippets of media that is not selected, wherein the amount of display area of the first one of the remaining snippets of media after the interaction with the one of the snippets of media is less than the amount of display area occupied by the first one of the remaining snippets of media before the interaction with the one of the snippets of media.

18. A system for displaying an image on a web page based on a selection received via a user identification account, comprising:

one or more servers configured to:

receive, via a user identification (ID) assigned to a user, the selection of the image from a plurality of images displayed within the web page on a display device of a client device and a time associated with the selection of the image on the display device of the client device, wherein the web page has a uniform resource locator (URL), wherein each of the images occupies the same amount of display area on the display device of the client device and are displayed at a depth on the web page, wherein the selection is received via a computer network from the client device;

examine metadata associated with the image that is selected to identify a keyword and criteria associated with the image that is selected, the keyword including an identification of the image that is selected and the criteria including the time associated with the selection of the image on the client device;

rank the image compared to remaining ones of the images based on the keyword and the criteria;

designate, for the user ID for which the image is selected, an arrangement having a higher amount of display area and a lower depth to be occupied by the image that is selected on the web page based on the rank, wherein the higher amount of display area is greater than the amount of display area occupied by each of the images before the designation of the higher amount, wherein the lower depth is less than and is outward compared to the depth at which the images are displayed before said designating of the lower depth, wherein the higher amount of the display area and the lower depth are configured to hide a first one of the remaining images, to hide a portion of a second one of the remaining images, and to display a remaining portion of the second one of the remaining images, wherein the lower depth is designated to indicate that the image that is selected is to be displayed as a pop-up with respect to the remaining images, wherein the image that is selected is displayed at a different z location than a z location of the remaining images to cover the first one of the remaining images and to cover the portion of the second one of the remaining images;

receive a search request via the user ID;

analyze the search request to determine that the search request includes the keyword; and send via the computer network the arrangement to the display device for display of the image selected via the user ID as occupying the higher amount of the display area at the lower depth on a subsequent display of the web page, wherein the arrangement is sent to the display device in response to the analysis of the search request that is received via the user ID after the selection of the image is received;

receive a geo-location of the client device from the client device;

determine that the image that is selected is to be displayed in a language associated with the geo-location;

increase a size of the image in response to determining that the image that is selected is to be displayed in the language associated with the geo-location, one or more memory devices configured to store the keyword and the criteria.

19. The system of claim 18, wherein the criteria includes:
a time at which the image is selected;
or an amount of time for which the image is viewed by a user;
or a number of times the image is selected; or
the geo-location of the client device; or a combination thereof.

20. The system of claim 18, wherein the one or more servers are configured to:
designate an amount of display area to be occupied by the first one of the remaining images that is not selected, wherein the amount of display area of the first one of the remaining images after the reception of the selection is less than the amount of display area occupied by the first one of the remaining images before the reception of the selection.

* * * * *